July 26, 1960

L. PÉRAS 2,946,408

DISC BRAKE

Filed June 1, 1956

July 26, 1960 L. PÉRAS 2,946,408
DISC BRAKE
Filed June 1, 1956 3 Sheets-Sheet 2
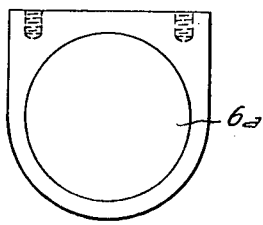
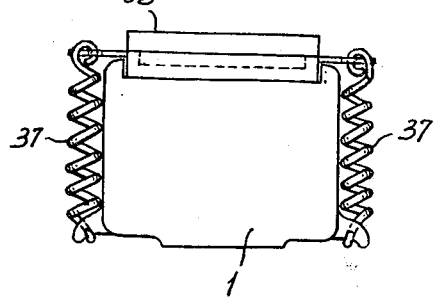
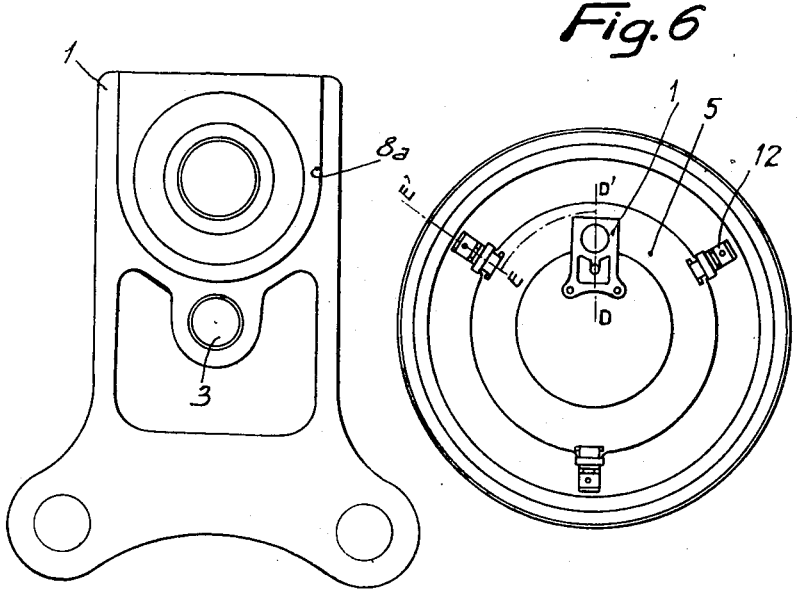

July 26, 1960  L. PÉRAS  2,946,408
DISC BRAKE
Filed June 1, 1956  3 Sheets-Sheet 3
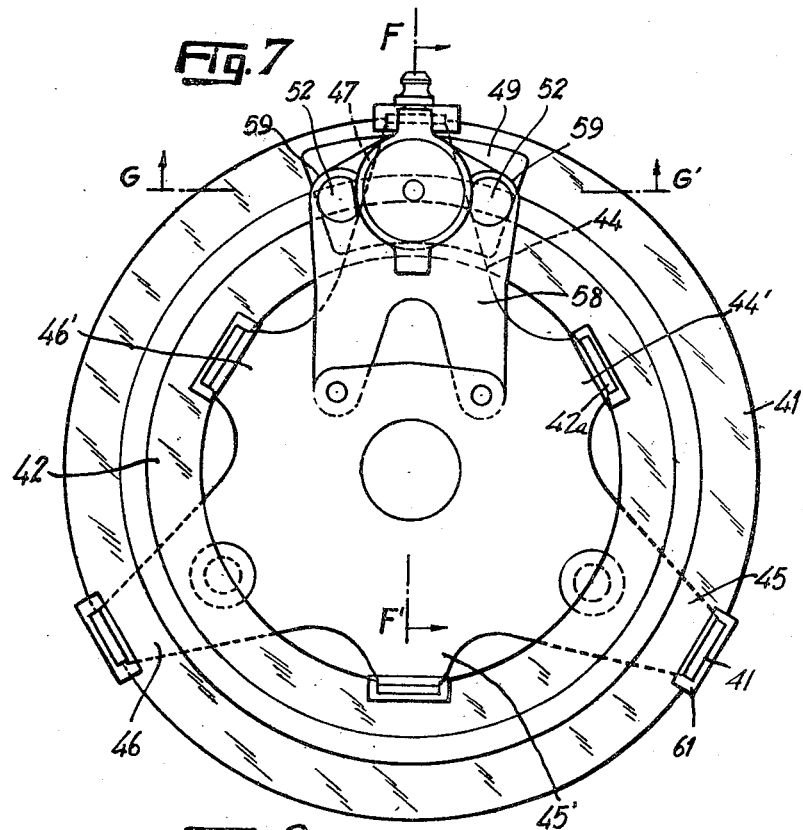
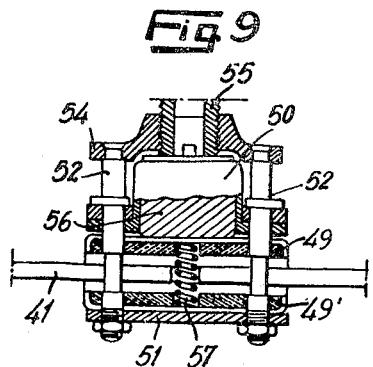
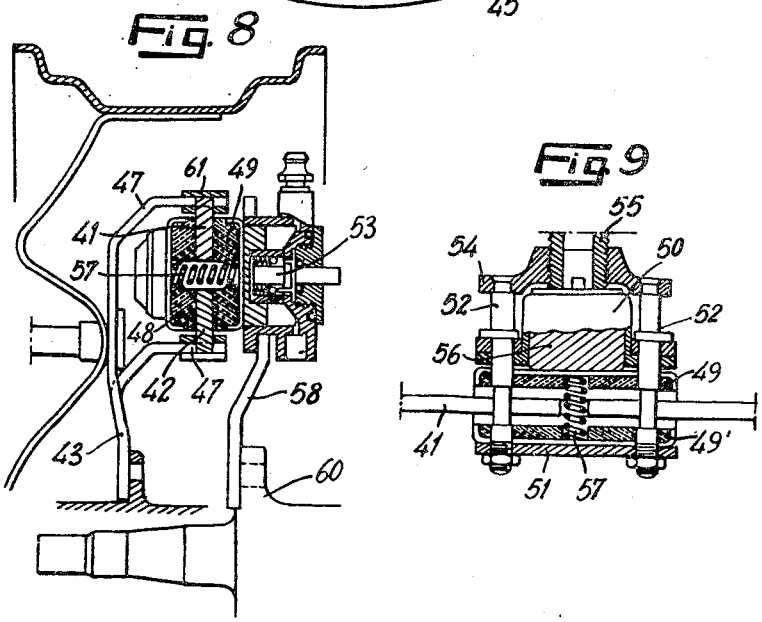

United States Patent Office 2,946,408
Patented July 26, 1960

2,946,408
DISC BRAKE

Lucien Péras, Billancourt, France, assignor to Regie Nationale des Usines Renault, Billancourt, France Filed June 1, 1956, Ser. No. 588,641

Claims priority, application France June 7, 1955

6 Claims. (Cl. 188—73)

The invention relates to improvements in disc brakes, especially for motor vehicles; in brakes of the kind in question a disc rotationally driven by the wheel and capable of lateral displacement is gripped between two linings, of which at least one is laterally displaceable, accommodated in a fixed support.

The invention relates to a device which is notable chiefly for its simplicity of manufacture and assembly and its low weight and small size, the linings of the device being capable of being easily exchanged.

According to a feature of the invention, this brake comprises, in addition to a hydraulic control actuating a single piston, an independent hand-operated control acting on the same linings, this control being such that it is possible to apply the hand brake when the foot-operated hydraulic control is also applied, without release occurring when the hydraulic control pedal is released.

The invention also relates, in connection with this brake, to a particularly simple and efficacious device for taking up play.

In accordance with another feature, the invention aims at an improvement according to which the disc consists of two annular concentric pieces situated in the same plane, and leaving between them a space which is also annular, and forms a passage for the connecting pieces between the members pressing and holding the linings.

The advantages and features of the invention will become apparent from the following description of a form of embodiment illustrated by way of example in the attached drawing, wherein:

Fig. 2 is a detailed face view of a lining and its holder;

Fig. 3 is a view showing the attachment of the linings;

Fig. 5 is a face view along BB' of one half of the holder;

Fig. 6 is an overall diagrammatic view of a wheel equipped with the brake;

Fig. 7 is a plan view of a brake comprising the disc in two parts;

Fig. 8 is a view partly sectioned along FF' in Fig. 7;

Fig. 9 is a section along GG' in Fig. 7, but with the addition of a hand-brake strap.

Figure 1:
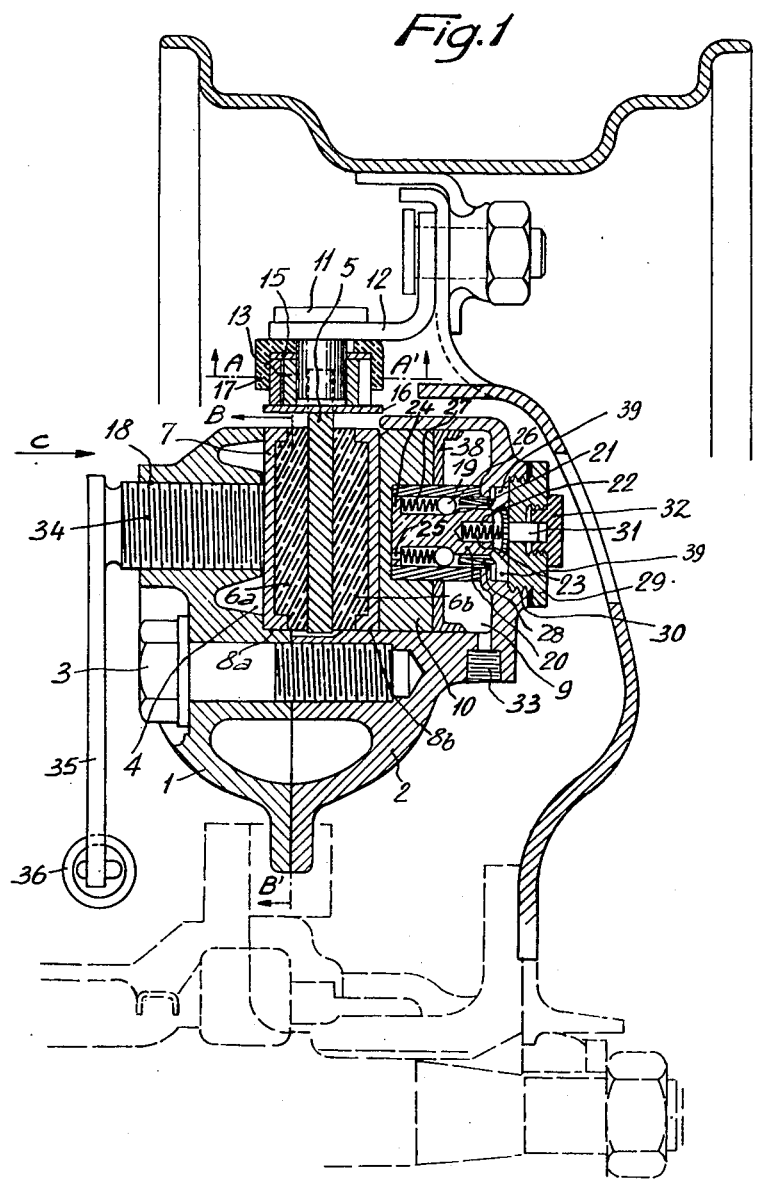
Fig. 1 is an elevation view of the brake, partly sectioned along DD', EE' in Fig. 6.

With reference to the drawings, it will be seen that the brake consists of a main body or housing consisting of two pieces 1, 2, connected by a screw 3, an arrangement which has the advantage of reducing machining and the total number of parts. Between these two parts there is, at the top, a cavity having a semi-circular base 4 traversed by the disc 5 and intended to receive the linings 6a and 6b fitted on dished members 7; these dished members 7, which carry the linings rest freely on the base of the cavity formed by two associated edges 8a, 8b of the parts 1, 2. They are respectively disposed on each side of the disc 5. The part 2 forms a cylinder 9 containing a piston 10 intended to apply the linings against the disc 5.

Figures 4, 4A:
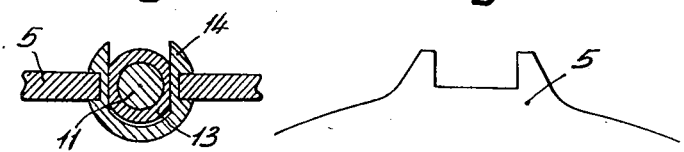
Fig. 4 is a detailed section along AA' in Fig. 1 of the disc-holder.
Fig. 4a is a plan view showing a detail of the disc.

The disc 5 is driven by the wheel by means of three attachment members (Figs. 1 and 6), which however leave it free to move laterally. Each of these attachment members comprises: a pin 11 connected by a bracket 12 to the wheel (Figs. 1 and 4); a member 13 comprising two flat portions, a piece 14 embedded in the disc 5, the washers 15, 16 and a protective rubber cap 17, of which the slightly compressed plane portion prevents any noise when the brake is released.

The lining 6a normally abuts against the pressure wall of the piece 1, under the action of springs 37 (Figs. 1 and 3), the piece 1 being pierced by a threaded bore 18, the function of which will be indicated later.

It will be seen from Fig. 1 that the piston 10 has on its rear face a device intended to take up play and to keep the hand-brake applied; this device will now be described in detail; it consists of a sleeve 19 forced into a bore in the piston, and of a small cylindrical element 20 formed with a conical ramp 21, and finally an axial bore 22 containing a spring 23, and the base of this element, provided with a collar 24, is pierced by an orifice 25. The cylindrical part of this element is surrounded by a set of balls 26 pushed against the ramp 21 by springs 27, and is covered by a cup-shaped piece 28, against the base of which the spring 23 bears. The piece 28 is held in place by the nut 29 closing the aperture 30 provided in the part 2 of the body; a plunger 31 situated on the axis of the nut 29, and allowing the cup 28 to be operated, as will be explained later, is normally protected by a nut 32.

Finally, the cylinder 9 has external communication via an orifice 33 serving for the entry of fluid under pressure, and its return to a container (not shown).

The part 1 of the body containing the lining 6a is provided, as already stated, with a threaded orifice 18. The latter receives a multiple threaded screw 34 actuated by a cable or rod 35 by way of a spring 36. The lining 6a (like the lining 6b) is itself returned so as to abut against the base of the part 1 by means of springs 37.

The brake operates as follows:

The fluid placed under pressure by operation of the brake pedal enters the cylinder 9, and pushes the piston 10, of which the rear face is provided with a dished rubber member 38 for sealing purposes. This piston 10, by way of lining 6b, pushes the disc 5 against the lining 6a which abuts against the base of the piece 1. The disc 5 is easily displaced because the embedded pieces 14 slide against the pressure faces of the D-shaped members 13 having flat portions which are kept fixed. It will be noted that the disc can consist of stamped sheet metal which does not need to be strictly plane, since pressure is exerted only on a small portion of its surface.

The moving piston drives the sleeve 19, which leaves a free space towards the wall of the piece 2, via which the oil first of all enters the sleeve 19, and then proceeds via the orifice 25 as far as the part of the piston 10 surrounded by the sleeve 19, in such a way as to allow pressure to be exerted over the whole surface of the piston 10. However, the fluid also drives the cylinder 20 to an extent equal to the maximum play provided for between the abutments 39 fast with the piece 20 and the wall of the body 2.

The sleeve 19 (fast with the piston) and the cylindrical element 20 thus move forward together in one movement, like the balls 26 and their springs 27, to an extent equal to the maximum play provided for. If lining wear exceeds this normal play provided for, the sleeve 19, driven by the piston 10, continues to move forward, and is displaced in relation to the element 20.

On the contrary, during the return movement under the action of the springs 37, wedging of the balls between the internal wall of the sleeve 19 and the conical ramp maintains the relative displacement which has been acquired, so that the piston 10 will be moved forward to an extent equal to the wear.

When the hand control is operated, it pushes the lining 6a against the disc, via the lever 35 and the screw 34, and pushes the disc against the lining 6b which abuts via the sleeve 19 against the wall of the body 2.

If the hydraulic control is already in action when the hand control is operated, and operation of the hydraulic control ceases, the brake remains applied by the hand control. In fact, the piston 10 can only retract by a maximum amount equal to the normal play provided for, and this play is easily compensated by a corresponding forward movement of the lining 6a under the action of a strong spring 36 situated on the control of the screw 34.

The particular arrangement of the linings, allowing them to be exchanged very rapidly, will finally be noted, the linings engaging freely in the groove 4 in the body by reason of the normal play provided for the braking device, and also by reason of the transverse freedom of the disc 5. The operation is carried out, with or without removal of the wheel, by withdrawing the linings in position by the top after having unhooked the return springs; the piston 10, which was displaced to an extent equal to the sum of the wear on the two linings, is then pushed back; for this purpose, the balls are unwedged by pressing on the plunger, after the nut 32 has been unscrewed, with the aid of a hole provided in the cheek of the wheel support.

When the piston has been caused to press against the cylinder, the two new linings are introduced, and the return springs are hooked on.

If reference is now made to Figs. 7, 8 and 9, showing a variant of the brake previously described in which the disc is in two parts, it will be seen that this disc consists of two concentric annular elements 41 and 42, situated in the same vertical plane, and having an annular space between them. These elements are advantageously produced by edge-bending sheet or strip metal, and welding two half-circumferences.

These discs are driven with the wheel by the piece 43 which connects the wheel to the hub. This piece comprises arms terminating in curved-back projections 47 engaging in notches 41a, 42a provided in the discs 41 and 42 respectively.

In the form illustrated, the long arms 44, 45, 46 support the external disc 41, while the short arms 44', 45', 46' support the internal disc 42. Each disc 41, 42, centered by the three projections which drive it, remains free to move laterally in relation to them.

Protectors 61, for example consisting of rubber, can be provided for the purpose of shielding the driving surfaces of the discs.

Linings 48 and 49 are situated respectively on each side of the discs in such a way as to be able to rub against them. They are pressed against the discs by a hydraulic cylinder 50 containing a piston 56, provided with a device 53 for taking up play, such as that previously described.

These linings are spaced apart, as illustrated, by a spring 57, situated in the central portion and directly traversing the annular space between the discs 41 and 42.

These linings are preferably so shaped that the pressure surface is substantially proportional to the radius of action, in such away as to equalise wear.

As illustrated, the group consisting of the pressure members, linings and hydraulic cylinder is assembled by means of a mounting comprising bolts 52 passing through the annular space between the discs 41 and 42, and traversing the linings by way of guide-carriers; these bolts hold a stirrup 51 against the back of one lining, which allows application by the piston in the hydraulic cylinder.

If it is desired to add a manually-controlled brake, a strap 54 is placed on the extended bolts 52; this strap receives a multiple-threaded screw 55, which allows a grip to be exerted between the stirrup 51 and the piston 56 fast with the cylinder 50 via the device 53 for taking up play. The group is carried by a piece 58 having two lugs 59, each freely traversed by one of the bolts 52, the piece 58 being attached at its base to a fixed part 60 of the wheel support.

An arrangement is thus produced which is easy to manufacture and low in weight, while allowing the use of a return spring situated directly between the linings.

I claim:

1. In a hydraulic disc brake assembly for a wheel, in combination, at least one friction disc rotatable with the wheel and displaceable axially of the wheel, means fixing the disc to the wheel so as to rotate therewith including means to allow lateral displacement of the disc in a direction axially of the wheel, a first and a second friction lining disposed on opposite faces of said brake disc both of which are laterally displaceable in a direction axially of the wheel, a brake housing straddling a portion of said disc and provided with a space forming a cylinder, dual operators for selectively displacing the displaceable linings axially of the wheel thereby to frictionally engage the linings and the brake disc to brake the wheel, said operators comprising a fluid-operated piston operable in said cylinder for selectively applying axially directed pressure to said first displaceable lining to brake the wheel, manually-operated means for selectively applying axially directed pressure to the second laterally displaceable lining and disc simultaneously with and separately from the piston operator and in a direction opposite to the direction which said piston applies pressure, and means cooperating with said piston for automatically maintaining a selected normal play between the piston and the displaceable linings, thereby to compensate for lining wear and for limiting the movement of said piston in a direction away from the disc and first lining when the manually operated means applies pressure to the disc in said opposite direction and separately from the piston operator.

2. In a hydraulic disc brake assembly for a wheel according to claim 1, including a second rotative, laterally displaceable friction disc concentric with said first mentioned disc and disposed spaced radially therefrom and in a plane substantially corresponding with a plane in which said first mentioned disc is disposed.

3. In a hydraulic disc brake assembly for a wheel according to claim 2, further including spring means disposed in an annular space defined by said radially spaced concentric discs for biasing the linings in opposite directions away from one another.

4. In a hydraulic disc brake assembly for a wheel according to claim 1, in which said means fixing the disc to the wheel comprise a pair of arms, and in which said means to allow lateral displacement of said disc comprises a floating pin arrangement.

5. In a hydraulic disc brake assembly for a wheel, in combination, at least one annular friction disc rotatable with the wheel and displaceable axially of the wheel, means fixing the disc to the wheel so as to rotate therewith including means to allow lateral displacement of the disc in a direction axially of the wheel, a first and a second friction lining disposed on opposite faces of said brake disc both of which are laterally displaceable in a direction axially of the wheel, said disc being disposed for rotation between said linings, a brake housing straddling a portion of said disc and provided with a space forming a cylinder, dual operators for selectively displacing the displaceable linings axially of the wheel thereby to frictionally engage the linings and the brake disc to brake the wheel, said operators comprising a fluid-operated piston operable in said cylinder for selectively applying axially directed pressure to said first displaceable lining to brake the wheel, manually-operated means for selectively applying axially directed pressure to the second laterally displaceable lining and disc simultaneously with and separately from the piston operator and in a direction opposite to the direction which said piston applies pressure, means cooperating with said piston for automatically maintaining a selected normal play between the piston and the displaceable linings thereby to compensate for lining wear and for limiting the movement of said piston in a direction away from the disc and first lining when the manually operated means applies pressure to the disc in said opposite direction and separately from the piston operator, said means for automatically maintaining a selected normal play between the piston and the linings comprising means operable in said cylinder including releasable clutch balls for maintaining said piston in a selected rest position relative said first lining to maintain said selected normal play between the piston and the displaceable first lining, means for releasing said clutch balls to allow displacement of said piston in a direction opposite to the lining engaging direction thereby to allow easy removal of said linings, and removable means closing said cylinder providing access to said means for releasing said clutch balls to allow said displacement of the piston for easy removal of the linings.

6. In a hydraulic disc brake assembly for a wheel, in combination, at least one annular friction disc rotatable with the wheel and displaceable axially of the wheel, means fixing the disc to the wheel so as to rotate therewith including means to allow lateral displacement of the disc in a direction axially of the wheel, a pair of friction linings disposed on opposite faces of said brake disc both of which are laterally displaceable in a direction axially of the wheel, a brake housing straddling a portion of said disc and provided with a space forming a cylinder, dual operators for selectively displacing the displaceable linings axially of the wheel thereby to frictionally engage the linings and the brake disc to brake the wheel, said operators comprising a fluid-operated piston operable in said cylinder for selectively applying axially directed pressure to one of said displaceable linings to brake the wheel, manually operated means for selectively applying axially directed pressure to the other laterally displaceable lining and disc simultaneously with and separately from the piston operator, said manually operated means having means arranged to apply pressure to the linings and disc in a direction axially of the wheel and opposite to the direction that the fluid-operated piston applies pressure thereto and including automatic slack-adjuster means cooperating with said piston for automatically maintaining a selected normal play between the piston and the displaceable lining cooperative therewith.

References Cited in the file of this patent
UNITED STATES PATENTS

| | | |
|---|---|---|
| 2,109,722 | Fawich | Mar. 1, 1938 |
| 2,135,666 | Hunt | Nov. 8, 1938 |
| 2,174,400 | McCune | Sept. 26, 1939 |
| 2,245,988 | Lambert | June 17, 1941 |
| 2,251,379 | Van Der Hof | Aug. 5, 1941 |
| 2,252,906 | Williamson | Aug. 19, 1941 |
| 2,541,031 | Butler | Feb. 13, 1951 |
| 2,587,931 | Van Der Wilt | Mar. 4, 1952 |
| 2,633,941 | Zindler | Apr. 7, 1953 |
| 2,669,327 | Chamberlain et al. | Feb. 16, 1954 |
| 2,732,042 | Lucker | Jan. 24, 1956 |
| 2,736,396 | Rasmussen et al. | Feb. 28, 1956 |
| 2,843,225 | Miller | July 15, 1958 |

FOREIGN PATENTS

| | | |
|---|---|---|
| 467,206 | Canada | Aug. 8, 1950 |
| 717,350 | Great Britain | Oct. 27, 1954 |
| 762,890 | Germany | Jan. 18, 1954 |
| 703,860 | Great Britain | Feb. 10, 1954 |